(12) United States Patent
Chen et al.

(10) Patent No.: US 12,305,015 B2
(45) Date of Patent: May 20, 2025

(54) BIODEGRADABLE POLYMER EXPANDED BEAD CAPABLE OF BEING FORMED BY STEAM COMPRESSION MOLDING

(71) Applicant: Useon Technology Limited, Jiangsu (CN)

(72) Inventors: Zhiqiang Chen, Jiangsu (CN); Tian Xia, Jiangsu (CN); Junfeng Chang, Jiangsu (CN)

(73) Assignee: Useon Technology Limited, Jiangsu (CN)

( * ) Notice: Subject to any disclaimer, the term of this patent is extended or adjusted under 35 U.S.C. 154(b) by 0 days.

(21) Appl. No.: 18/914,379

(22) Filed: Oct. 14, 2024

(65) Prior Publication Data
US 2025/0034346 A1 Jan. 30, 2025

Related U.S. Application Data

(63) Continuation of application No. PCT/CN2023/084124, filed on Mar. 27, 2023.

(30) Foreign Application Priority Data

Mar. 6, 2023 (CN) .......................... 202310205613.8

(51) Int. Cl.
  *C08J 9/18* (2006.01)
  *C08J 3/22* (2006.01)
  (Continued)

(52) U.S. Cl.
  CPC ................ *C08J 9/18* (2013.01); *C08J 3/226* (2013.01); *C08J 9/0061* (2013.01); *C08J 9/122* (2013.01);
  (Continued)

(58) Field of Classification Search
  CPC ... C08J 9/18; C08J 3/226; C08J 9/0061; C08J 9/122; C08J 9/232; C08J 2201/03;
  (Continued)

(56) References Cited

U.S. PATENT DOCUMENTS

| | | | |
|---|---|---|---|
| 2007/0027247 A1* | 2/2007 | Ueda .................... | C08K 5/1515 524/445 |
| 2017/0100861 A1* | 4/2017 | Pawloski ............ | B29C 44/3461 |
| 2019/0237224 A1 | 8/2019 | Heinemann et al. | |

FOREIGN PATENT DOCUMENTS

| | | |
|---|---|---|
| CN | 102051031 A | 5/2011 |
| CN | 102127245 A | 7/2011 |

(Continued)

OTHER PUBLICATIONS

International Search Report received in corresponding International Patent Application No. PCT/CN2023/084124, mailed Nov. 29, 2023, 11 pages.

(Continued)

*Primary Examiner* — K. Boyle
(74) *Attorney, Agent, or Firm* — Cooper Legal Group, LLC

(57) ABSTRACT

The present application discloses a biodegradable polymer expended bead capable of being formed by steam compression molding, including the following components in parts by weight: 10-88 parts of PBS, 10-88 parts of PLA, 1-4 parts of a chain extender masterbatch, 1-3 parts of a nucleating agent masterbatch and 5-12 parts of a supercritical $CO_2$ foaming agent; wherein a concentration of optical isomer D-lactic acid monomer in a molecular chain of the PLA is 2-8%. The present application uses PBS and PLA as polymer matrixes, with an addition of a chain extender and a nucleating agent. The chain extender undergoes a chain extension reaction and a branching reaction with reactive end groups of PLA and PBS. The expended bead has good (Continued)

heat resistance, and can be formed using steam compression molding to obtain a steam compression molded product with good adhesion between beads and stable size.

11 Claims, 2 Drawing Sheets

(51) Int. Cl.
*C08J 9/00* (2006.01)
*C08J 9/12* (2006.01)
*C08J 9/232* (2006.01)
*C08L 67/02* (2006.01)
*C08L 67/04* (2006.01)

(52) U.S. Cl.
CPC ............... *C08J 9/232* (2013.01); *C08L 67/02* (2013.01); *C08L 67/04* (2013.01); *C08J 2201/03* (2013.01); *C08J 2203/08* (2013.01); *C08J 2205/044* (2013.01); *C08J 2367/02* (2013.01); *C08J 2367/04* (2013.01); *C08J 2425/14* (2013.01); *C08J 2467/02* (2013.01); *C08J 2467/04* (2013.01); *C08L 2201/06* (2013.01); *C08L 2203/14* (2013.01); *C08L 2205/025* (2013.01); *C08L 2205/03* (2013.01); *C08L 2205/24* (2013.01); *C08L 2310/00* (2013.01)

(58) Field of Classification Search
CPC .............. C08J 2203/08; C08J 2205/044; C08J 2367/04; C08J 2425/14; C08J 2467/02; C08J 2467/04; C08L 67/02; C08L 67/04; C08L 2201/06; C08L 2203/14; C08L 2205/025; C08L 2205/03; C08L 2205/24; C08L 2310/00

See application file for complete search history.

(56) References Cited

FOREIGN PATENT DOCUMENTS

| | | | |
|---|---|---|---|
| CN | 102241831 A | 11/2011 | |
| CN | 102276964 A | 12/2011 | |
| CN | 105602215 A | 5/2016 | |
| CN | 109354847 A | 2/2019 | |
| CN | 113372605 A | 9/2021 | |
| CN | 113910485 A * | 1/2022 | ............ B29B 9/065 |
| DE | 102020205096 A1 | 10/2021 | |
| GB | 2591121 A | 7/2021 | |
| KR | 102257140 B1 | 5/2021 | |

OTHER PUBLICATIONS

Ding, Y., et al., "Compatibilization Strategies of PLA-Based Biodegradable Materials", Progress in Chemistry, 2020, 32(6): 738-751, with English abstract.

* cited by examiner

BIODEGRADABLE POLYMER EXPANDED BEAD CAPABLE OF BEING FORMED BY STEAM COMPRESSION MOLDING

CROSS-REFERENCE TO RELATED APPLICATIONS

The present application is a continuation application of PCT application No. PCT/CN2023/084124, filed on Mar. 27, 2023, which claims priority to Chinese patent application No. 202310205613.8, filed on Mar. 6, 2023. The entireties of PCT application No. PCT/CN2023/084124 and Chinese patent application No. 202310205613.8 are hereby incorporated by reference herein and made a part of this specification.

TECHNICAL FIELD

The present application relates to a technical field of biodegradable materials, and, in particular, to a biodegradable polymer expanded bead capable of being formed by steam compression molding.

BACKGROUND ART

Biodegradability refers to a property of material degradation caused by biological activities, especially an action of enzymes, which is gradually digested by microorganisms or certain organisms as a source of nutrients, resulting in a decrease in molecular weight, loss of quality, and deterioration in physical properties, and ultimately decomposed into simple chemical compounds and mineralized inorganic salts of contained elements, as well as biological dead bodies. Due to increasing environmental concerns and an implementation of relevant laws and regulations, biodegradable materials are attracting increasing attention in various fields. Currently, raw materials of a biodegradable polymer produced on a stable industrial scale in Chinese market mainly include polylactic acid (PLA), polybutylene adipate terephthalate (PBAT), poly(butylene succinate) (PBS) and copolymers thereof, such as poly(butylene succinate-co-butylene adipate) (PBSA), poly(butylene adipate-co-terephthalate) (PBST), and the like. The raw materials for synthesizing the biodegradable polymer can be wholly or partially derived from nature, such as PLA and PBS, or from petroleum-based chemical products, such as PBAT.

Polymer expanded bead technology is an important light-weighting technology for polymers. Expanded beads can be used for preparing high-expansion-rate products with complex geometric shapes and accurate sizes through steam compression molding. Those products have excellent energy absorption and thermal insulation properties and are widely used in fields of packaging, thermal insulation, toys, automobiles and the like. Polymer expanded beads include expandable beads, which contain a foaming agent, and expanded beads. Polymer molecular chains in a crystalline region of the expanded beads are arranged neatly and cannot dissolve or store foaming agents with small molecule, such as a polypropylene expanded bead (EPP). Amorphous polymers, however, can dissolve the foaming agent below their glass transition temperature (Tg) to prepare polymer beads containing the foaming agent, namely the expandable beads, such as an expandable polystyrene bead (EPS). The expandable bead can be further pre-expanded, thus increasing an expansion ratio. A shape of products of the expanded bead is determined by the shape of a mold during a steam molding process. The molding process mainly includes steps of expanded bead filling, steam sintering, cooling, product ejection, post-processing and the like. During the molding process, the expanded beads contact each other and when the expanded beads are heated by steam above their Tg, the polymer molecular chains can freely cross an interface between the expanded beads by diffusion, and subsequent cooling freezes a physical entanglement and crystallization of the polymer molecular chains at the interface, resulting in good adhesion between the expanded beads.

Existing technologies for preparing the biodegradable polymer expanded bead, specifically a polylactic acid (PLA) expanded bead, primarily use a batch method, which includes the following steps: preparing an unexpanded PLA particle; heating and pressurizing the unexpanded PLA particle to saturation temperature and pressure, keeping for a certain period of time and saturating by a foaming agent of $CO_2$; and decompression expanding to obtain the PLA expanded bead. However, the batch method leads to low production efficiency and high costs for industrial-scale production. Additionally, when these expanded beads are formed using steam compression molding, due to a poor heat resistance of PLA with Tg and softening temperature (Ts) of about 60° C., the PLA expanded bead is prone to shrinkage under steam molding conditions, and a steam compression molded product with good adhesion between beads and stable size is difficult to obtain.

SUMMARY

In view of the above disadvantages, the present application provides a biodegradable polymer expanded bead capable of being formed by steam compression molding, a preparation method, and a molding process. The expanded bead can be produced continuously and efficiently, and the expanded bead has good heat resistance and can be formed using steam compression molding to obtain the steam compression molded product with good adhesion between beads and stable size.

In a first aspect, the present application provides a biodegradable polymer expanded bead capable of being formed by steam compression molding, adopting the following technical solutions.

A biodegradable polymer expanded bead capable of being formed by steam compression molding, including the following components in parts by weight: 10-88 parts of PBS, 10-88 parts of PLA, 1-4 parts of a chain extender masterbatch, 1-3 parts of a nucleating agent masterbatch and 5-12 parts of a supercritical $CO_2$ foaming agent; wherein a concentration of optical isomer D-lactic acid monomer in a molecular chain of the PLA is 2-8%.

In some specific embodiments, the expanded bead includes the following components in parts by weight: 10-58 parts of PBS, 40-88 parts of PLA, 2-3 parts of the chain extender masterbatch, 1.5-2.5 parts of the nucleating agent masterbatch and 8-10 parts of the supercritical $CO_2$ foaming agent; wherein the concentration of optical isomer D-lactic acid monomer in the molecular chain of the PLA is 2-4%.

Commercial PLA and PBS are linear polymer molecules with low molecular weight, which have low melt viscosity and strength, and are prone to bubble rupture and merging during a melt foaming process. The present application uses poly(butylene succinate) (PBS) and polylactic acid (PLA) as polymer matrixes, with an addition of the chain extender masterbatch. The chain extender undergoes a chain extension reaction and a branching reaction with reactive end groups of PLA and PBS, effectively increasing the molecular weight of the polymer. Long branched structures are introduced into a main molecular chain of polymers to improve melt strength and elasticity, achieving continuous and efficient preparation of the biodegradable polymer expanded bead. The expanded bead has good heat resistance, and can be formed using steam compression molding to obtain the steam compression molded product with good adhesion between beads and stable size.

The present application limits the concentration of optical isomer D-lactic acid monomer in the molecular chain of the PLA. The lower the content of D-lactic acid monomer, the better the crystallinity of PLA; the higher the content of D-lactic acid monomer, the poorer the crystallization performance of PLA, the lower the heat resistance of PLA, and the more prone to shrinkage during steam compression molding. The concentration of D-lactic acid monomer selected in the present application is 2-8%. However, when the concentration of D-lactic acid monomer is less than 2%, PLA has strong crystallization capability and high crystallinity, and a crystalline region in the PLA matrix imposes significant restrictions on a movement of molecular chains in an amohourps region. During the steam molding process, molecular chains of the PLA within an expanded bead matrix are not easily diffused into adjacent expanded beads, reducing an effectiveness of steam molding and hindering a mutual bonding of adjacent expanded beads during the steam molding process.

In some specific embodiments, a melt flow index of the PBS is 4-10 g/10 min.

In some specific embodiments, the melt flow index of the PLA is 4-20 g/10 min.

The melt flow index of PLA and PBS selected in the present application is relatively low, because under low melt flow index conditions, the molecular weight of PLA and PBS is high and a foaming performance is good. Therefore, the melt flow index of PLA selected in the present application is 4-20 g/10 min, preferably 4-10 g/min; and the melt flow index of PBS selected in the present application is 4-10 g/10 min, preferably 4-7 g/10 min.

In some specific embodiments, when the concentration of optical isomer D-lactic acid monomer in the molecular chain of the PLA is 2-4%, a melting point of the PLA is 155-165° C.

When the concentration of the D-lactic acid monomer is 2-4%, the melting point of PLA is 155-165° C., PLA has a moderate crystallization capability, ensuring that the expanded bead do not shrink during steam compression molding while enabling good bonding between adjacent expanded beads.

In some specific embodiments, the chain extender masterbatch is prepared by melt blending a polyfunctional chain extender with a carrier of PBSA, and a concentration of the polyfunctional chain extender in the chain extender masterbatch is 10-50 wt %; wherein the chain extender is 3,3,4,4-benzophenone tetracarboxylic dianhydride or a copolymer of styrene-acrylate-glycidyl methacrylate.

In order to improve a stability of the processing process and product quality, the present application adopts a form of masterbatch when preparing the chain extender. At the same time, in order to maintain a biodegradability of the expanded bead and promote a dispersion of the chain extender masterbatch in PLA and PBS matrices during an extrusion foaming process, a biodegradable polymer poly(butylene succinate-co-adipate) (PBSA, melting point Tm=84° C.) with a low melting point is selected as a carrier of the masterbatch. PBSA is melt blended with a powder of the chain extender using a twin-screw extruder to produce the chain extender masterbatch, which helps to prepare expanded beads with uniform composition and stable performance.

The chain extender selected is either an anhydride chain extender, such as 3,3,4,4-dibenzophenone tetracarboxylic dianhydride (BTDA, tetrafunctional, melting point of 218-222° C.) or an epoxy chain extender, such as the copolymer of styrene-acrylate-glycidyl methacrylate (BASF Joncryl ADR-4368, average functionality of 9), both of which are in powder form with low addition amount. However, if the chain extender is added directly, an uniform dispersion of the chain extender in a polymer melt will be affected, resulting in a formation of gels; fluidization also occurs at an initial stage of processing, interfering with the effective and stable transportation of other particulate materials in the extruder, eventually leading to fluctuations in the foaming process.

In some specific embodiments, the nucleating agent masterbatch is prepared by melt blending a heterogeneous nucleating agent with PBSA, wherein a concentration of the heterogeneous nucleating agent in the nucleating agent masterbatch is 10-40 wt %

In some specific embodiments, the heterogeneous nucleating agent is one or more selected from a group consisting of: talcum powder, calcium carbonate, silica, and nano-clay.

In a preparation process of the biodegradable polymer expanded bead, in order to reduce a nucleation energy barrier of pores, improve a nucleation rate of pores, and reduce a size of pores, the heterogeneous nucleating agent is added to a foaming system. The nucleating agent is one or more selected from the group consisting of: talcum powder, calcium carbonate, silica, and nano-clay. During the extrusion foaming process, directly adding a powder of the nucleating agent can also affect the stability of feeding other components. In order to promote the dispersion of the powder of the nucleating agent in the polymer melt, the present application melt blends the powder of the nucleating agent with PBSA to prepare the nucleating agent masterbatch, which helps to prepare expanded beads with stable size and excellent performance.

In some specific embodiments, a density of the expanded bead is 15-65 g/L, and an average pore diameter is 15-100 μm.

By adopting the above technical solution, the expanded beads involved in the present application are lightweight, uniform in size, and stable.

In a second aspect, the present application provides a method for preparing the biodegradable polymer expanded bead capable of being formed by steam compression molding, including the following steps:

melt blending the PBS, PLA, chain extender masterbatch, and nucleating agent masterbatch, and performing a chain extension reaction on a resulting mixture at a temperature of 180-240° C.;

injecting the supercritical $CO_2$ foaming agent into an extruder to form a homogeneous solution of polymer/$CO_2$;

homogenizing and cooling the homogeneous solution of polymer/$CO_2$ to a temperature of 95-180° C.; and extruding the homogeneous solution of polymer/$CO_2$ through a multihole foaming template to obtain the bead; wherein a pressure of the homogeneous solution of polymer/$CO_2$ at the template is 10-18 MPa.

In a third aspect, the present application provides a process for forming the biodegradable polymer expanded bead capable of being formed by steam compression molding, including the following steps:

pre-pressurizing the expanded bead with a compressed air;
filling the expanded bead into a mold under a pressurized condition; and
performing a steam compression molding on the expanded bead in the mold;
wherein, a temperature of the steam compression molding needs to meet the following conditions:
1) higher than glass transition temperatures (Tg) of PBS and PLA; wherein the Tg of PLA is 60° C. and the Tg of PBS is −34° C.;
2) higher than a heat deflection temperature (HDT) of PLA, and the HDT of PLA is ≥60° C.; and
3) not higher than the heat deflection temperature (HDT) of PBS, and the HDT of PBS is ≥90° C.

The molding process of the expanded bead in the present application involves pre-pressurizing the expanded bead with the compressed air initially, then filling the expanded bead into the mold under the pressurized condition. The temperature of the steam compression molding should be higher than the glass transition temperatures of PLA and PBS to ensure that chain segments of PLA and PBS can freely pass through the interfaces between particles during the steam molding process. The temperature of the steam compression molding should be higher than the HDT of PLA, which is about 60° C., to allow a PLA phase on a surface of the expanded bead to deform and soften, improve an interaction between adjacent expanded beads. The temperature of the steam compression molding is close to or lower than the HDT of PBS, usually ≥90° C., in order to maintain the stability of a skeleton structure and pore structure of the expanded bead, and prevent shrinkage of a formed product.

In summary, the present application includes at least the following beneficial technical effects.

1. In the present application, PBS and PLA are used as polymer matrixes, polyfunctional epoxy and/or anhydride compounds are used as a compatilizer and the chain extender, the heterogeneous nucleating agent is used to reduce the nucleation energy barrier of pores, improve the nucleation rate of pores, and reduce the size of pores, thereby improving the foaming performance and stability of PLA and PBS during the foaming process, and achieving continuous and efficient preparation of biodegradable PBS/PLA expanded beads. The expanded bead has good heat resistance, and can be formed using steam compression molding to obtain the steam compression molded product with good adhesion between beads and stable size.

2. In the present application, the biodegradable polymer PBSA with low melting point is used as the carrier polymer of auxiliary agent masterbatches such as the chain extender, the nucleating agent and the like, and on the basis of keeping the biodegradability of a final extrusion foaming product, the dispersion of the auxiliary agent in a PLA/PBS resin system is effectively promoted, and the stability of the extrusion foaming process is improved.

3. PLA and PBS resins in the expanded bead matrix prepared by the present application play roles in promoting the adhesion between beads and stabilizing the skeletal structure and pore structure of the expanded bead, and can be used for preparing biodegradable polymer foaming products conveniently and efficiently by using existing steam forming equipment and processes of the expanded bead in the industry.

DETAILED DESCRIPTION

Figure 1:
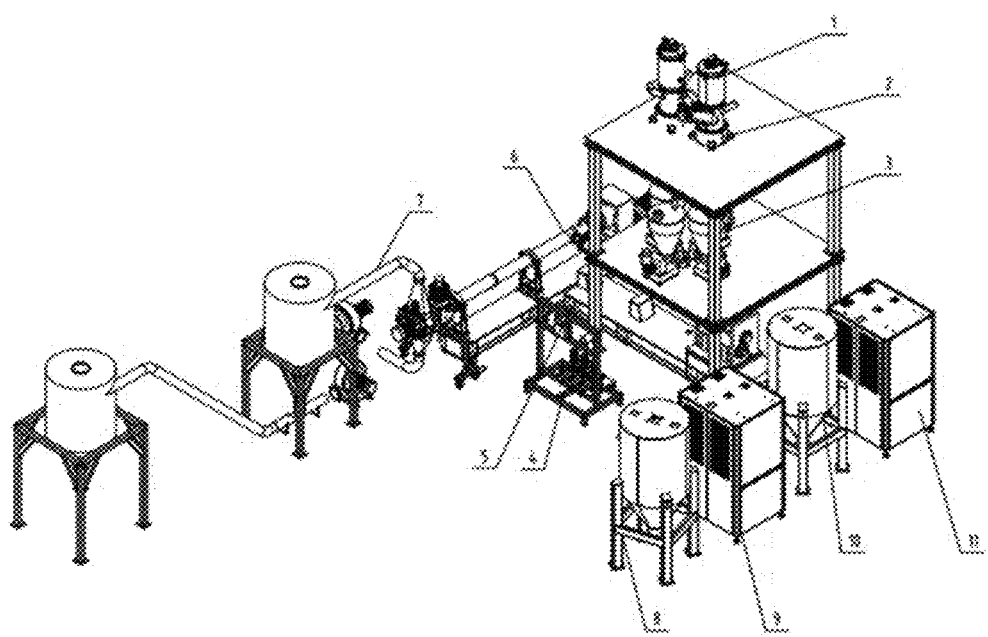
FIG. 1 is a schematic view of an apparatus for preparing a biodegradable polymer expanded bead.

In the present application, PBS and PLA are used as polymer matrixes; polyfunctional epoxy and/or anhydride compounds are used as the compatilizer and the chain extender; talcum powder or calcium carbonate, silicon dioxide and the like are used as the nucleating agent; the supercritical $CO_2$ is used as the foaming agent, to achieve continuous and efficient preparation of the biodegradable polymer expanded bead capable of being formed by steam compression molding.

The biodegradable polymer expanded bead prepared in the present application includes the following components.

a. PBS: Constitutes 10-88 wt % of components a-d, preferably 10-58 wt %, and more preferably 10-28 wt %. The melting point of PBS is 114-116° C.; the heat deflection temperature of PBS is ≥80° C. (ISO75, 0.45 MPa), preferably ≥90° C.; the melt flow index of PBS is 4-10 g/10 min (at 190° C./2.16 kg), preferably 4-7 g/10 min.

b. PLA: Constitutes 10-88 wt % of components a-d, preferably 40-88 wt %, and more preferably 70-88 wt %. The melt flow index of PLA is 4-20 g/10 min, preferably 4-10 g/10 min; the concentration of optical isomer D-lactic acid monomer in the molecular chain of the PLA is 2-8%, preferably 2-4%; the melting point of PLA is 130-165° C., and when the concentration of optical isomer D-lactic acid monomer in the molecular chain of the PLA is 2-4%, the melting point of the PLA is 155-165° C.

c. Chain Extender Masterbatch: The biodegradable polymer PBSA (melting point Tm=84° C.) is adopted as the polymer carrier, and is melt blended with the powder of the chain extender to prepare the chain extender masterbatch. The powder of the chain extender is selected from the anhydride chain extender, such as 3,3',4,4'-benzophenone tetracarboxylic dianhydride (BTDA, tetrafunctional, melting point of 218-222° C.); or the epoxy-type chain extender, such as the copolymer of styrene-acrylate-glycidyl methacrylate (BASF Joncryl ADR-4368, average functionality of 9). The chain extender masterbatch constitutes 1~4 wt % of components a-d, preferably 2-3 wt %.

d. Nucleating Agent Masterbatch: Prepared by melt blending PBSA with a powder of the nucleating agent; the powder of the nucleating agent is one or more selected from a group consisting of: talcum powder, calcium carbonate, silica, and nano-clay. The nucleating agent masterbatch constitutes 1-3 wt % of components a-d, preferably 1.5-2.5 wt %.

e. Foaming Agent: The supercritical $CO_2$ is used as the foaming agent, and the foaming agent constitutes 5-12 wt % of components a-d, preferably 8-10 wt %.

A preparation process of component c, namely the chain extender masterbatch, is as follows.

Melt blending PBSA particles and the powder of the chain extender through a twin-screw extruder, and a length-to-diameter ratio (L/D) of the extruder is 30-48, preferably 30-36. A screw speed during a blending process is 100-250 rpm, preferably 150-200 rpm, and a blending temperature is 85-150° C., preferably 85-115° C. The concentration of the chain extender in the masterbatch is 10-50 wt %, preferably 20-30 wt %.

A preparation process of component d, namely the nucleating agent masterbatch, is as follows.

Melt blending the powder of the nucleating agent with PBSA to prepare the nucleating agent masterbatch. The powder of the nucleating agent is one or more selected from the group consisting of: talcum powder, calcium carbonate, silica, and nano-clay. An equipment used is a twin-screw extruder which is the same as that used in the preparation process of the chain extender masterbatch, and the length-to-diameter ratio (L/D) of the extruder is 30-48, preferably 30-36. The screw speed during the blending process is 100-250 rpm, preferably 150-200 rpm, and the blending temperature is 85-150° C., preferably 85-115° C. The concentration of the nucleating agent in the masterbatch is 10-40 wt %, preferably 15-25 wt %.

A preparation process of the expanded bead will be described in detail below with reference to FIG. 1.

Before entering the extruder, components a and b are dehumidified and dried using a low dew point air (dew point≤−45° C.). The air is dried through a molecular sieve or other forms of dehumidification sources in a dehumidifier, then heated before entering a dehumidification cylinder, ensuring sufficient heat and mass exchange with the resin, effectively removing moisture from the resin matrix. Component a is dried using a PBS dehumidifier 8 and a PBS dehumidification cylinder 9, and component b is dried using a PLA dehumidifier 10 and a PLA dehumidification cylinder 11. A drying time for PBS and PLA is 4-6 h, and a drying temperature for PBS is 70-80° C. and for PLA is 50-60° C. After dehumidifying and drying, a water content in the resin is 50-300 ppm, preferably 50-100 ppm. A dried resin sequentially passes through a suction hopper 1 and a buffer hopper 2, then enters a loss-in-weight feeder 3, feeding into the extruder at a constant mass flow rate. Simultaneously, components c and d are fed into the extruder in the same way.

Components a-d undergo melt plasticization, mixing, and chain expansion reactions in a twin-screw extruder 5 on an upper stage of a tandem extruder unit. A screw length-to-diameter ratio of the twin-screw extruder 5 is 36:1-60:1, preferably 44:1-52:1; the temperature is set to 180-240° C., preferably 200-240° C., and more preferably 200-220° C. Subsequently, component e is injected through an injection system 4 at the constant mass flow rate into a middle of a barrel of the extruder 5, where it disperses and mixes with the polymer melt of components a-d, forming the homogeneous solution of polymer/$CO_2$ that then enters a single-screw extruder 6 on a lower stage of the tandem extruder unit. The melt pressure at an end of the twin-screw extruder 5 is 10-20 MPa, preferably 15-20 MPa. The twin-screw extruder 5 and the single-screw extruder 6 can be vertically or parallel connected. The homogeneous solution of polymer/$CO_2$ is homogenized and cooled in the extruder 6 to achieve a melt strength required for extrusion foaming. The length-to-diameter ratio of the single-screw extruder 6 is 24:1-40:1, preferably 30:1-36:1; after injecting the supercritical $CO_2$ foaming agent, the temperature is set to 95-180° C., preferably 110-145° C. An end of the single-screw extruder 6 is equipped with an extruded multihole foaming template, with a hole diameter of 0.5-1.5 mm, preferably 0.7-1.2 mm, and more preferably 0.7-0.9 mm; an aspect ratio of holes is 2-15, preferably 3-10; a hole spacing is greater than 5 mm, preferably greater than 10 mm, and more preferably greater than 13 mm. By optimizing the temperature setting of the single-screw 6 on the lower stage and the hole spacing on the multihole foaming template, can effectively avoid the expanded beads extruded from adjacent holes on the template from sticking to each other during an air delivery process, without a need for cooling the expanded beads with a cooled low-temperature air. One or more of a static mixer, a melt pump, and a three-way valve may be installed between the barrel of the single-screw extruder 6 and the foaming template. At the foaming template, the pressure of the homogeneous solution of polymer/$CO_2$ is 10-18 MPa, preferably 12-16 MPa.

Figure 2:
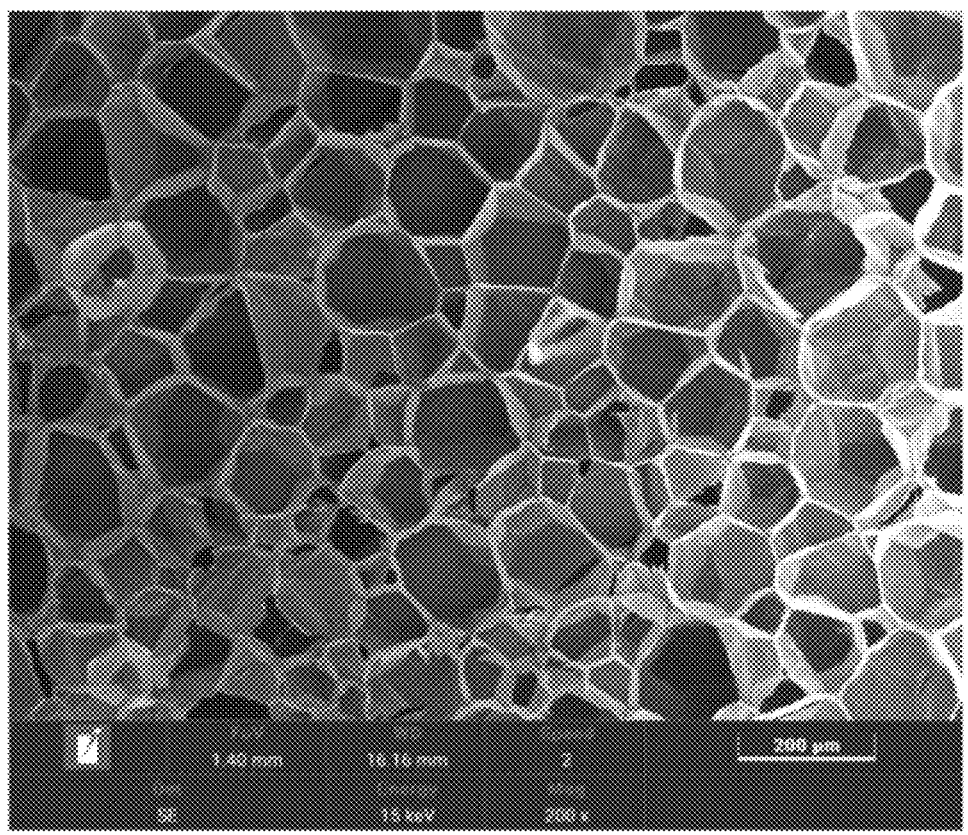
FIG. 2 is a morphology view of pores of a biodegradable polymer expanded bead.

The homogeneous solution of polymer/$CO_2$ cooled by the single-screw extruder 6 is decompressed and expanded when flowing through the multihole foaming template. An extrudate is then cut into the expanded bead with a particle size of about 1-5 mm, preferably 1-3 mm, more preferably 1-2 mm at a high speed by a rotary cutter of a granulator of an air-cooling granulating system 7 after exiting the template. The expanded bead is then cooled and transported by an air blower to a collection container. Either a single-stage air blower or a tandem two-stage air blower can be used. The density of the biodegradable polymer expanded bead is 15-65 g/L, preferably 20-45 g/L, and more preferably 20-30 g/L; a typical morphology view of pores is shown in FIG. 2, with an average pore diameter of 15-100 μm, preferably 15-85 μm, and more preferably 15-50 μm.

The biodegradable polymer expanded bead prepared by the present application can be formed by steam compression molding, and the method can be used for efficiently preparing biodegradable expanded products with high shape freedom and low density. During the steam molding process, the expanded bead is pre-pressurized with the compressed air and then filled into the mold under the pressurized condition. As the expanded bead is heated by steam, a surface of the expanded bead can deform to some extent, and an air inside the pores undergoes secondary expansion due to heating, increasing a contact area between the beads. A steam temperature during the molding process is a crucial parameter that determines a bonding quality between the beads. The steam molding temperature for the biodegradable polymer expanded bead prepared by the present application needs to meet the following conditions:
1) higher than the glass transition temperature (Tg) of PBS and PLA; wherein the Tg of PLA is 60° C. and the Tg of PBS is −34° C.;
2) higher than the heat deflection temperature (HDT) of PLA, and the HDT of PLA is ≥60° C.; and
3) not higher than the heat deflection temperature (HDT) of PBS, and the HDT of PBS is ≥90° C.

The technical solutions of the present application will be further described in detail below with reference to Examples and Comparative Examples.

Preparation Example 1

A chain extender masterbatch, using the copolymer of styrene-acrylate-glycidyl methacrylate (BASF Joncryl ADR-4368) as the chain extender with a concentration of 30 wt % in the masterbatch. PBSA (PTTMCC FD92) was used as a carrier resin with a melting point of 84° C. and a concentration of 70 wt % in the masterbatch. The chain extender masterbatch was prepared by extruding and granulating using the twin-screw extruder with a length-to-diameter ratio (L/D) of 36, a screw speed of 200 rpm and a blending temperature of 85-110° C.

Preparation Example 2

A chain extender masterbatch, using 3,3',4,4'-benzophenone tetracarboxylic dianhydride (BTDA) as the chain extender with a concentration of 20 wt % in the masterbatch. PBSA (PTTMCC FD92) was used as the carrier resin with a melting point of 84° C. and a concentration of 80 wt % in the masterbatch. The chain extender masterbatch was prepared by extruding and granulating using the twin-screw extruder with a length-to-diameter ratio (L/D) of 40, a screw speed of 150 rpm and a blending temperature of 85-120° C.

Preparation Example 3

A nucleating agent masterbatch, using talcum powder (AIHAI-IMI HTP2 L) as the nucleating agent with a concentration of 25 wt % in the masterbatch. PBSA (PTTMCC FD92) was used as the carrier resin with a concentration of 75 wt % in the masterbatch. The nucleating agent masterbatch was prepared by extruding and granulating using the twin-screw extruder with a length-to-diameter ratio (L/D) of 48, a screw speed of 200 rpm and a blending temperature of 85-125° C.

Preparation Example 4

A nucleating agent masterbatch, using talcum powder (AIHAI-IMI HTPultra5 L) as the nucleating agent with a concentration of 15 wt % in the masterbatch. PBSA (PTTMCC FD92) was used as the carrier resin with a concentration of 85 wt % in the masterbatch. The nucleating agent masterbatch was prepared by extruding and granulating using the twin-screw extruder with a length-to-diameter ratio (L/D) of 44, a screw speed of 300 rpm and a blending temperature of 85-120° C.

Examples 1-5

A biodegradable polymer expanded bead capable of being formed by steam compression molding was prepared by adopting the following formula and preparation method.

Component a: PBS, selected from Blue Ridge Tunhe TH803S, with a melting point of 114° C., a melt flow index of 6-8 g/10 min (at 190° C./2.16 kg), a heat deflection temperature (HDT) of ≥80° C., preferably ≥90° C., a concentration of carboxyl end group of 12 mol/t, and a water content post-drying of 150 ppm.

Component b: PLA, selected from Fengyuan Biotechnology FY804, with a concentration of optical isomer D-lactic acid monomer of 4%, a melting point of 155° C., a melt flow index of 4 g/10 min (at 190° C./2.16 kg), and a water content post-drying of 100 ppm.

Component c: Chain extender masterbatch prepared in Preparation Example 1.

Component d: Nucleating agent masterbatch prepared in Preparation Example 3.

Component e: Supercritical $CO_2$ foaming agent.

Biodegradable polymers were extruded and expended using a tandem extruder unit, with a twin-screw extruder on an upper stage having a screw diameter of 52 mm and L/D ratio of 48, and a single-screw extruder on a lower stage having a diameter of 90 mm and L/D ratio of 30. A three-way valve and a multihole foaming template were installed sequentially at an end of the single-screw extruder on the lower stage, with a hole diameter of the template of 0.9 mm, an aspect ratio of holes of 3, and a hole spacing of 12 mm. A melt pressure at an end of the twin-screw extruder on the upper stage was 16-18 MPa, and the melt pressure at the template was 12-13 MPa. Blending temperatures for each zone were shown in Table 1, and an addition amount (wt %) of each component in Examples 1-5 were shown in Table 2.

TABLE 1

Process temperatures for each zone

| extruding zone | | blending temperature (° C.) |
|---|---|---|
| upper stage/twin-screw extruder | feeding zone | 180 |
| | melting zone | 200-220 |
| | mixing zone | 220-230 |
| | reaction zone | 230-240 |
| lower stage/single-screw extruder | | 110-115 |
| three-way valve | | 140-145 |
| foaming template | | 140-145 |

TABLE 2

Addition amount (wt %) of each component in Examples 1-5

| | component a | component b | component c | component d | component e |
|---|---|---|---|---|---|
| Example 1 | 10 | 85 | 3 | 2 | 9 |
| Example 2 | 23 | 72 | 3 | 2 | 9 |
| Example 3 | 33 | 62 | 3 | 2 | 9 |
| Example 4 | 45 | 50 | 3 | 2 | 9 |
| Example 5 | 55 | 40 | 3 | 2 | 9 |

Examples 6-10

A biodegradable polymer expanded bead capable of being formed by steam compression molding was prepared by adopting the following formula and preparation method.

Component a: PBS, selected from PTTMCC BioPBS FZ91, with a melting point of 115° C., a melt flow index of 5 g/10 min (at 190° C./2.16 kg), a heat deflection temperature (HDT) of 95° C., and a water content post-drying of 100 ppm.

Component b: PLA, selected from Fengyuan Biotechnology FY602, with a concentration of optical isomer D-lactic acid monomer of 2%, a melting point of 165° C., a melt flow index of 9 g/10 min (at 190° C./2.16 kg), and a water content post-drying of 50 ppm.

Component c: Chain extender masterbatch prepared in Preparation Example 2.

Component d: Nucleating agent masterbatch prepared in Preparation Example 4.

Component e: Supercritical $CO_2$ foaming agent.

Biodegradable polymers were extruded and expended using a tandem extruder unit, with a twin-screw extruder on an upper stage having a screw diameter of 52 mm and L/D ratio of 48, and a single-screw extruder on a lower stage having a diameter of 90 mm and L/D ratio of 30. A three-way valve and a multihole foaming template were installed sequentially at an end of the single-screw extruder on the lower stage, with a hole diameter of the template of 1.2 mm, an aspect ratio of holes of 4, and a hole spacing of 14 mm. A melt pressure at an end of the twin-screw extruder on the upper stage was 15-16 MPa, and the melt pressure at the template was 14-15 MPa. Blending temperatures were shown in Table 3, and an addition amount (wt %) of each component in Examples 6-10 were shown in Table 4.

TABLE 3

Process temperatures for each zone in Examples 6-10

| extruding zone | | blending temperature (° C.) |
|---|---|---|
| upper stage/twin-screw extruder | feeding zone | 180 |
| | melting zone | 180-200 |
| | mixing zone | 200-220 |
| | reaction zone | 200-220 |
| lower stage/single-screw extruder | | 110-115 |
| three-way valve | | 140-145 |
| foaming template | | 140-145 |

TABLE 4

Addition amount (wt %) of each component in Examples 6-10

| | component a | component b | component c | component d | component e |
|---|---|---|---|---|---|
| Example 6 | 40 | 55.5 | 3 | 1.5 | 8 |
| Example 7 | 58 | 37.5 | 3 | 1.5 | 8 |
| Example 8 | 30 | 65.5 | 3 | 1.5 | 8 |
| Example 9 | 20 | 75.5 | 3 | 1.5 | 8 |
| Example 10 | 10 | 85.5 | 3 | 1.5 | 8 |

Example 11

An expanded bead, the difference from Example 4 is that polylactic acid (PLA) was used as the carrier resin of the chain extender masterbatch in the formula, the melting point of PLA was 155° C., and the blending temperature was 130-175° C.; the addition amount of the foaming agent was 8.5 wt %; the remainder of the formula and the preparation of the expanded bead were the same as in Example 4.

Example 12

An expanded bead, the difference from Example 4 is that the melt flow index of PBS used in the expanded bead was 20 g/10 min, and the melt flow index of PLA was 30 g/10 min.

Comparative Example 1

An expanded bead, the difference from Example 4 is that PBS was lack of in the formula, PLA was used as the polymer matrix alone, the PLA used was selected from Fengyuan Biotechnology FY804, with a concentration of optical isomer D-lactic acid monomer of 4%, a melting point of 155° C., a melt flow index of 4 g/10 min (at 190° C./2.16 kg), and a water content post-drying of 10 ppm. An injection amount of the foaming agent was 8 wt %.

During the foaming process, the blending temperatures on the upper stage were the same as in Example 4, the blending temperature on the upper stage was 115-125° C., and a head pressure was 12-13 MPa. The rest of the process was the same as in Example 4.

Comparative Example 2

An expanded bead, the difference from Example 4 is that the concentration of optical isomer D-lactic acid monomer in component b was 12%; the injection amount of the foaming agent was 12 wt %; the remainder of the formula and the preparation of the expanded bead were the same as in Example 4.

Testing Methods

Particle size: A size of 10 expanded beads was measured using a vernier caliper, and an average value was calculated.

Density: Foam density ($\rho_f$) was tested according to ASTM D792-00, measured using a balance equipped with a density assembly provided by Mettler Toledo company. A formula for calculating the $\rho_f$ is as follows:

$$\rho_f = \frac{a}{a+w-b}\rho_{water}$$

wherein: a is an actual mass of a sample in air;

b is the mass of the sample and a metal cap immersed together in water, and the metal cap plays a role in immersing the sample in water;

w is the mass of the metal cap alone immersed in water, $\rho_{water}$ is a density of water.

Average pore diameter: a morphology of pores of the expanded bead was characterized using Scanning Electron Microscopy (SEM). Firstly, the sample was immersed in liquid nitrogen for 10 minutes before fracturing to ensure an integrity of the morphology of pores. A fractured surface was then coated with platinum to enhance conductivity for SEM characterization. The average pore diameter (D) was obtained by analyzing SEM images using Image-Pro Plus software (Media Cybernetics, USA), and the average pore diameter can be calculated by the following formula:

$$D = \frac{\sum d_i n_i}{\sum n_i}$$

wherein, $n_i$ is the number of pores with diameter di in the SEM images.

Test results for Examples and Comparative Examples were shown in table 5.

TABLE 5 test results for Examples and Comparative Examples

| Sample | Particle size (mm) | Density (g/L) | average pore diameter (μv) |
|---|---|---|---|
| Example 1 | 2.2 | 25 | 48 |
| Example 2 | 2.2 | 24 | 46 |
| Example 3 | 2.2 | 24 | 44 |

TABLE 5-continued test results for Examples and Comparative Examples

| Sample | Particle size (mm) | Density (g/L) | average pore diameter (μv) |
|---|---|---|---|
| Example 4 | 2 | 22 | 42 |
| Example 5 | 2.2 | 23 | 43 |
| Example 6 | 1.2 | 35 | 85 |
| Example 7 | 1 | 32 | 80 |
| Example 8 | 1.3 | 38 | 86 |
| Example 9 | 1.5 | 38 | 88 |
| Example 10 | 1.4 | 38 | 88 |
| Example 11 | 2.2 | 20 | 55 |
| Example 12 | 2 | 30 | 58 |
| Comparative Example 1 | 2.5 | 18 | 60 |
| Comparative Example 2 | 2.8 | 32 | 65 |

As can be seen from the test results of Examples 1-6 and Table 5, PBS and PLA were used as a mixed matrix, polyfunctional epoxy and/or anhydride compounds were used as the chain extender, talcum powder was used as the nucleating agent, and supercritical CO was used as the foaming agent, then the expended beads with an uniform pore structure were prepared, and the preparation process was continuous and stable. The expended beads of Examples 1-5 have the particle size of about 2 mm, the density of 22-25 g/L, and the average pore diameter of 42-48 μm; the expended beads of Examples 6-10 have the particle size of 1-1.5 mm, the density of 32-38 g/L, and the average pore diameter of 80-88 μm. As can be seen from a variation regular pattern of the Examples, as the PBS content increases, the particle size of pores does not change significantly, while the density and pore diameter of the expended beads gradually decrease.

As can be seen from Example 11, when PLA was used as the carrier resin for the chain extender masterbatch and the nucleating agent masterbatch, compared to PBSA, PLA has a higher melting point. During the extrusion foaming process, the temperature of the lower stage host is increased, the head pressure is reduced, and the amount of $CO_2$ that can be dissolved is reduced, resulting in a decrease in the amount of $CO_2$ injected and a decrease in the density of the expended beads and an increase in the pore diameter.

As can be seen from Example 12, when the melt flow index of PBS and PLA used in the matrix was high, an expandability of the beads is reduced, the density is increased, and the pore diameter is increased, and the foaming effect of the beads is significantly affected. Therefore, it can be seen that PBS and PLA selected for use with low melt flow index are key factors affecting the foaming effect.

As can be seen from Comparative Example 1, when only PLA was used as the matrix, due to a high melting point, an equal amount of foaming agent cannot be added at the same blending temperature. Therefore, inventors increased a host temperature on the lower stage to 115-125° C., and reduced the amount of foaming agent added simultaneously, so that the particle size of the expended beads obtained is slightly increased, the density of the expended beads is reduced, and the pore diameter of pores is increased. However, shrinkage is prone to occur during steam compression molding.

As can be seen from Comparative Example 2, the concentration of D-lactic acid monomer in PLA was 12%, the crystallinity of PLA was poor, and a temperature resistance of PLA is reduced, resulting in shrinkage during steam molding.

The expanded beads of Examples 1 to 5 were subjected to steam compression molding at a molding temperature of 95-100° C. and the expanded beads in a molded product were well adhered to each other without shrinkage, indicating that the expanded beads of the present application were excellent in heat resistance. The expanded beads of Examples 6 to 10 were subjected to steam compression molding at a molding temperature of 90-95° C. and the expanded beads in a molded product were well adhered to each other without shrinkage, indicating that the expanded beads of the present application were excellent in heat resistance.

In addition, in order to improve a quality and a functionality of products, one or more of the following auxiliary agents can be added into the masterbatch: hydrolysis inhibitors, heat stabilizers, antistatic agents, UV absorbers, pigments and other plastic processing aids.

LISTING OF REFERENCE SIGNS

1 Suction hopper;
2. Buffer hopper;
3. Loss-in-weight feeder;
4. Injection system;
5. Twin-screw extruder;
6. Single-screw extruder;
7. Air-cooling granulating system;
8. PBS dehumidifier;
9. PBS dehumidification cylinder;
10. PLA dehumidifier;
11. PLA dehumidification cylinder.

What is claimed is:

1. A biodegradable polymer expanded bead capable of being formed by steam compression molding, comprising the following components in parts by weight: 10-88 parts of poly (butylene succinate) (PBS), 10-88 parts of polylactic acid (PLA), 1-4 parts of a chain extender masterbatch, 1-3 parts of a nucleating agent masterbatch and 5-12 parts of a supercritical $CO_2$ foaming agent; wherein a concentration of an optical isomer D-lactic acid monomer in a molecular chain of the PLA is 2-8%;
wherein a melt flow index of the PBS is 4-10 g/10 min.

2. The biodegradable polymer expanded bead capable of being formed by steam compression molding according to claim 1, comprising the following components in parts by weight: 10-58 parts of the PBS, 40-88 parts of the PLA, 2-3 parts of the chain extender masterbatch, 1.5-2.5 parts of the nucleating agent masterbatch and 8-10 parts of the supercritical $CO_2$ foaming agent; wherein the concentration of the optical isomer D-lactic acid monomer in the molecular chain of the PLA is 2-4%.

3. The biodegradable polymer expanded bead capable of being formed by steam compression molding according to claim 1, wherein a melt flow index of the PLA is 4-20 g/10 min.

4. The biodegradable polymer expanded bead capable of being formed by steam compression molding according to claim 1, wherein: when the concentration of the optical isomer D-lactic acid monomer in the molecular chain of the PLA is 2-4%, a melting point of the PLA is 155-165° C.

5. The biodegradable polymer expanded bead capable of being formed by steam compression molding according to claim 1, wherein the chain extender masterbatch is prepared by melt blending a polyfunctional chain extender with a carrier of Poly (butylene succinate-co-butylene adipate) (PBSA), and a concentration of the polyfunctional chain extender in the chain extender masterbatch is 10-50 wt %;

wherein the polyfunctional chain extender is 3,3,4,4-benzophenone tetracarboxylic dianhydride or a copolymer of styrene-acrylate-glycidyl methacrylate.

6. The biodegradable polymer expanded bead capable of being formed by steam compression molding according to claim 1, wherein the nucleating agent masterbatch is prepared by melt blending a heterogeneous nucleating agent with Poly (butylene succinate-co-butylene adipate) (PBSA), wherein a concentration of the heterogeneous nucleating agent in the nucleating agent masterbatch is 10-40 wt %; and the heterogeneous nucleating agent is one or more selected from a group consisting of: talcum powder, calcium carbonate, silica, and nano-clay.

7. The biodegradable polymer expanded bead capable of being formed by steam compression molding according to claim 1, wherein a density of the biodegradable polymer expanded bead is 15-65 g/L, and an average pore diameter is 15-100 μm.

8. A method for preparing the biodegradable polymer expanded bead capable of being formed by steam compression molding according to claim 1, comprising the following steps:
   melt blending the PBS, the PLA, the chain extender masterbatch, and the nucleating agent masterbatch, and performing a chain extension reaction on a resulting mixture at a temperature of 180-240° C.;
   injecting the supercritical $CO_2$ foaming agent into an extruder to form a homogeneous solution of polymer/$CO_2$;
   homogenizing and cooling the homogeneous solution of polymer/$CO_2$ to a temperature of 95-180° C.; and
   extruding the homogeneous solution of polymer/$CO_2$ through a multihole foaming template to obtain the biodegradable polymer expanded bead; wherein a pressure of the homogeneous solution of polymer/$CO_2$ at the multihole foaming template is 10-18 MPa.

9. A process for forming the biodegradable polymer expanded bead capable of being formed by steam compression molding according to claim 1, comprising the following steps:
   pre-pressurizing the biodegradable polymer expanded bead with compressed air;
   filling the biodegradable polymer expanded bead into a mold under a pressurized condition; and
   performing the steam compression molding on the biodegradable polymer expanded bead in the mold;
   wherein, a temperature of the steam compression molding meets the following conditions:
   1) The temperature of the steam compression molding is higher than glass transition temperatures (Tg) of the PBS and the PLA; wherein the Tg of the PLA is 60° C. and the Tg of the PBS is −34° C.;
   2) The temperature of the steam compression molding is higher than a heat deflection temperature (HDT) of the PLA, and the HDT of the PLA is ≥60° C.; and
   3) the temperature of the steam compression molding is not higher than the heat deflection temperature (HDT) of the PBS, and the HDT of the PBS is ≥90° C.

10. A biodegradable polymer expanded bead capable of being formed by steam compression molding, comprising the following components in parts by weight: 10-88 parts of poly (butylene succinate) (PBS), 10-88 parts of polylactic acid (PLA), 1-4 parts of a chain extender masterbatch, 1-3 parts of a nucleating agent masterbatch and 5-12 parts of a supercritical $CO_2$ foaming agent; wherein a concentration of an optical isomer D-lactic acid monomer in a molecular chain of the PLA is 2-8%; and when the concentration of the optical isomer D-lactic acid monomer in the molecular chain of the PLA is 2-4%, a melting point of the PLA is 155-165° C.

11. A biodegradable polymer expanded bead capable of being formed by steam compression molding, comprising the following components in parts by weight: 10-88 parts of poly (butylene succinate) (PBS), 10-88 parts of polylactic acid (PLA), 1-4 parts of a chain extender masterbatch, 1-3 parts of a nucleating agent masterbatch and 5-12 parts of a supercritical $CO_2$ foaming agent; wherein a concentration of an optical isomer D-lactic acid monomer in a molecular chain of the PLA is 2-8%; and the chain extender masterbatch is prepared by melt blending a polyfunctional chain extender with a carrier of Poly (butylene succinate-co-butylene adipate) (PBSA), and a concentration of the polyfunctional chain extender in the chain extender masterbatch is 10-50 wt %; wherein the polyfunctional chain extender is 3,3,4,4-benzophenone tetracarboxylic dianhydride or a copolymer of styrene-acrylate-glycidyl methacrylate.

* * * * *